(12) United States Patent
Evans

(10) Patent No.: US 9,536,458 B2
(45) Date of Patent: Jan. 3, 2017

(54) DISPLAY APPARATUS TO BE CARRIED ABOVE A WEARER'S HEAD

(75) Inventor: Mark Evans, Lanarkshire (GB)

(73) Assignee: NOMADIX MEDIA LIMITED, Glasgow ( * ) Notice: Subject to any disclaimer, the term of this patent is extended or adjusted under 35 U.S.C. 154(b) by 652 days.

(21) Appl. No.: 13/504,352

(22) PCT Filed: Oct. 25, 2010

(86) PCT No.: PCT/GB2010/001978
§ 371 (c)(1),
(2), (4) Date: Sep. 14, 2012

(87) PCT Pub. No.: WO2011/051658
PCT Pub. Date: May 5, 2011

(65) Prior Publication Data
US 2013/0033803 A1 Feb. 7, 2013

(30) Foreign Application Priority Data
Oct. 26, 2009 (GB) .................................. 0918743.6

(51) Int. Cl.
*G09F 21/02* (2006.01)
*A45F 3/14* (2006.01)
(Continued)

(52) U.S. Cl.
CPC ................. *G09F 21/02* (2013.01); *A45F 3/14* (2013.01); *F16M 11/10* (2013.01); *F16M 13/04* (2013.01);
(Continued)

(58) Field of Classification Search
CPC ........ G09F 21/02; G09F 9/301; G09F 21/026; G09F 27/00; A47F 3/14; F16M 11/10
(Continued)

(56) References Cited

U.S. PATENT DOCUMENTS 518,780 A * 4/1894 Fogg ............................... 40/586
6,344,605 B1 * 2/2002 Liao ............................... 84/421
(Continued)

FOREIGN PATENT DOCUMENTS

BE 1011540 10/1999
BE 1011540 A6 * 10/1999 ............. G09F 21/02
(Continued)

OTHER PUBLICATIONS

International Search Report for PCT/GB2010/001978 dated Mar. 3, 2011, 4 pages.
(Continued)

*Primary Examiner* — Syed A Islam
(74) *Attorney, Agent, or Firm* — Buchanan Nipper

(57) ABSTRACT

A wearable display apparatus comprises a support structure for supporting a display (6), in use, above a wearer's (2) head; and a weight-bearing torso support for supporting the support structure, the torso support being arranged to extend, in use, around the wearer's torso below the level of the wearer's arms. The support structure comprises a yoke (12) arranged to sit on the wearer's shoulders; and at least one support member extending from the display to the wearer's shoulders and from there to the torso support. Where it extends over the wearer's shoulders, the support member bears on the yoke to distribute the weight of the apparatus between the yoke and the torso support.

18 Claims, 8 Drawing Sheets

(51) Int. Cl.
*F16M 13/04* (2006.01)
*G09F 27/00* (2006.01)
*G09F 9/30* (2006.01)
*F16M 11/10* (2006.01)
*A45F 3/00* (2006.01)

(52) U.S. Cl.
CPC ............ *G09F 9/301* (2013.01); *G09F 21/026* (2013.01); *G09F 27/00* (2013.01); *A45F 2003/001* (2013.01); *A45F 2003/148* (2013.01)

(58) Field of Classification Search
USPC .................. 40/586; 224/267, 266; 84/421
See application file for complete search history.

(56) References Cited

U.S. PATENT DOCUMENTS

| | | | | |
|---|---|---|---|---|
| 6,561,394 B2* | 5/2003 | Pripps et al. | ................ | 224/161 |
| 6,843,012 B1* | 1/2005 | Dodd | ............................. | 40/586 |
| 7,779,567 B2* | 8/2010 | Saliege | ........................... | 40/586 |
| 2007/0199219 A1 | 8/2007 | Saliege | | |
| 2008/0070765 A1* | 3/2008 | Brown et al. | ................ | 482/140 |
| 2009/0272779 A1* | 11/2009 | Vu | ............................... | 224/677 |

FOREIGN PATENT DOCUMENTS

| | | |
|---|---|---|
| CH | 118860 | 2/1927 |
| FR | 814487 | 6/1937 |
| GB | 2 336 707 | 10/1999 |
| WO | WO-03/079319 | 9/2003 |
| WO | WO2009/003480 | 1/2009 |

OTHER PUBLICATIONS

Written Opinion for PCT/GB2010/001978 dated Mar. 3, 2011, 7 pages.

* cited by examiner

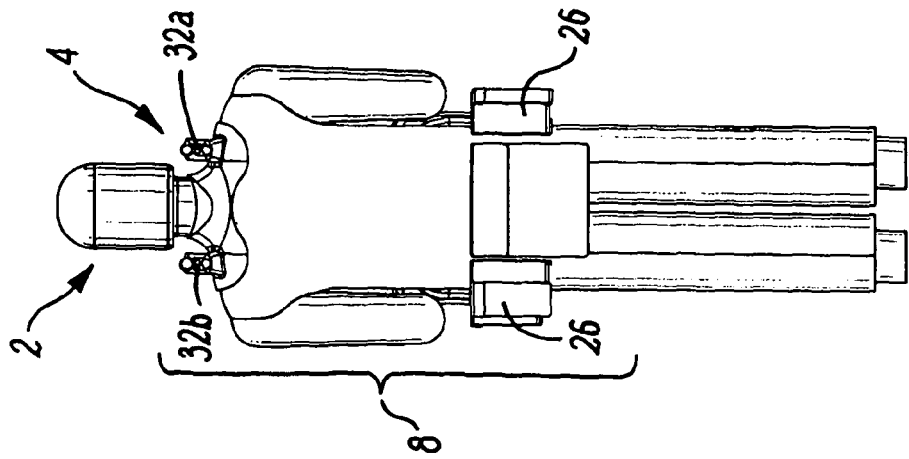
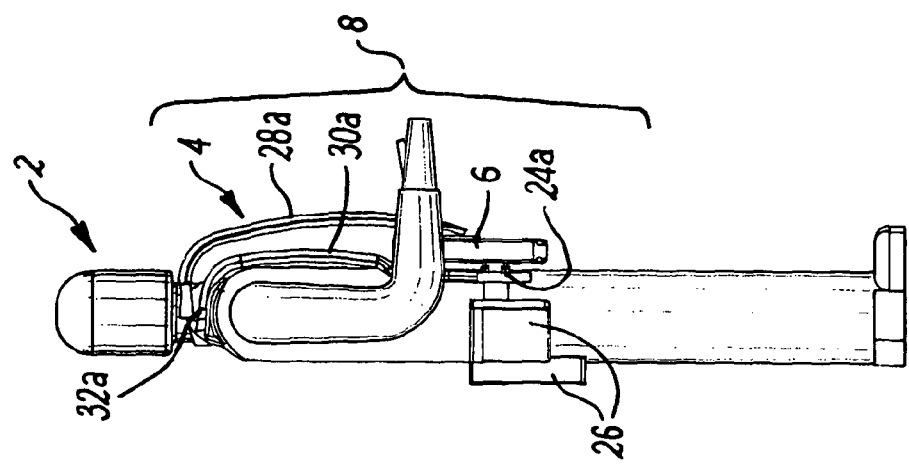
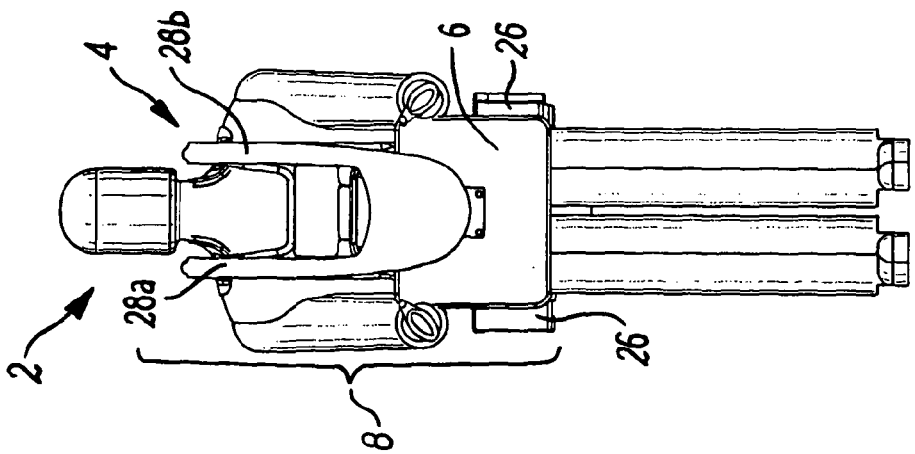

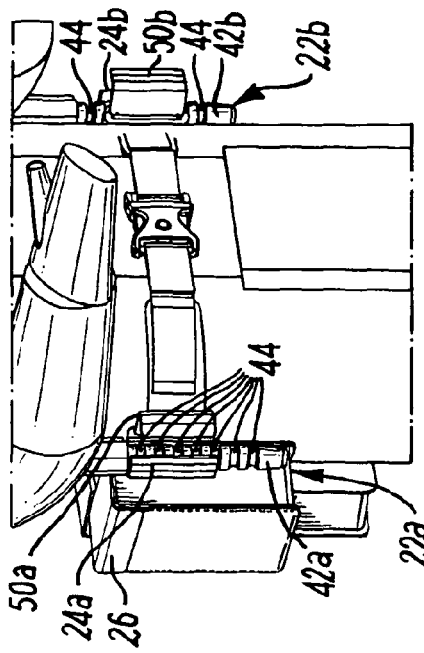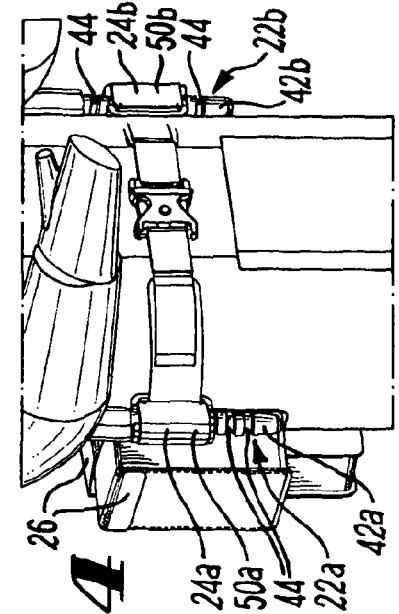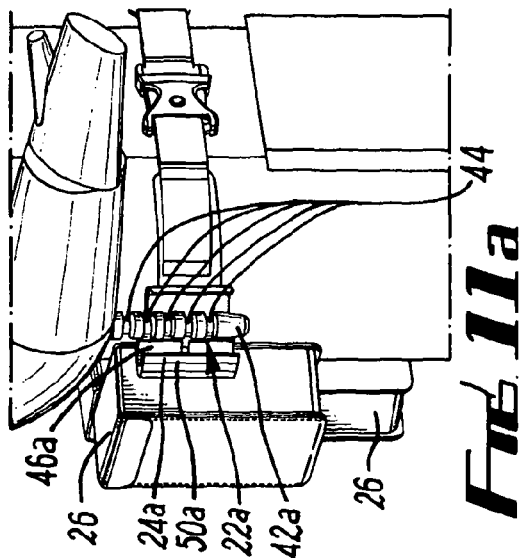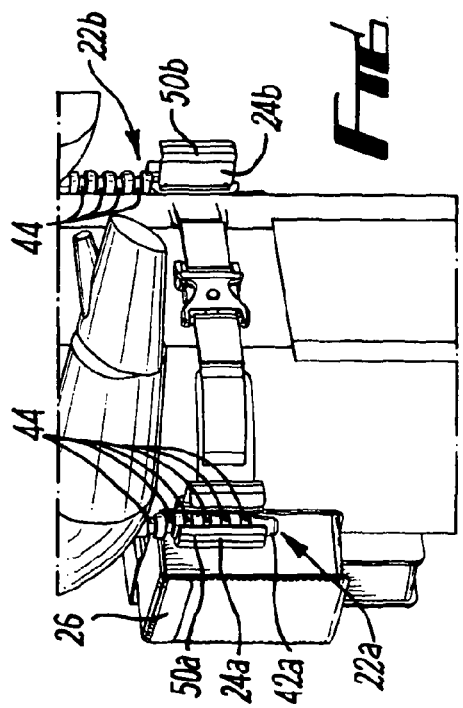
Fig. 11a
Fig. 11b
Fig. 12
Fig. 13
Fig. 14

DISPLAY APPARATUS TO BE CARRIED ABOVE A WEARER'S HEAD

This invention relates to mobile display systems. In particular, the invention relates to mobile information display systems that are used to display information such as to advertise goods or services, which are worn by an individual so that the wearer is able to walk and move around freely. Such display systems are typically used in areas where there are large numbers of pedestrians, for example, in shopping centres, at sports events or at music festivals.

One of the earliest examples of a wearable display system is a sandwich board. This simply comprises two rigid boards, one in front and one behind the wearer's body, connected by shoulder straps. Information is displayed on the outer faces of the boards.

A problem with sandwich boards is that when used in crowded areas, only those directly adjacent to the wearer are able to view the information displayed on the boards. People further away are unlikely to be able to view the information due to obstructions such as other people or street furniture.

This problem is overcome by the display system of French Patent No. 814,487 which discloses a sandwich board arrangement with a further board supported over the wearer's head. Information displayed on the overhead board can be seen clearly from a distance in a crowded area. FR 814,487 further improves visibility by illuminating the boards.

With the advent of electronic flat-screen technology, the concept of an overhead board has been developed by the use of one or more liquid crystal display (LCD) screens on which information such as advertisements is displayed. For example, the display system disclosed in UK Patent No. 2336707 comprises two LCD screens, arranged back-to-back and mounted on a backpack-like harness. One screen faces to the rear of the wearer and the other screen is mounted above the wearer's head and faces to the front.

Advances in portable audiovisual technology have enabled the delivery of multimedia experiences via wearable display systems, with video displays accompanied by an audio track. For example, International Patent Application Publication No. WO 03/079319 discloses a display system in which a base support in the small of the wearer's back supports an upright pole, at the top of which a screen is attached. The base support contains speakers. The base support is attached to a carrying sack which has straps to enable the apparatus to be worn backpack-style on the wearer's back. The carrying sack contains a media source such as a DVD player or a portable computer, an amplifier for driving the speakers, and a power source such as batteries, which may also require a DC-AC inverter.

In use of the display system of WO 03/079319, the wearer requires an assistant to help the wearer to don the system and to check that it is being worn correctly. For the system to look its best, the upright pole must be substantially vertical. Clearly this is difficult for the wearer to check when wearing the system. The alignment of the equipment is important because if the upright pole is not vertical the screen will be skewed, which will detract from the quality of the marketing message.

In addition, in use, the base support of the system of WO 03/079319 concentrates the weight of the system in the small of the wearer's back, which forces the wearer to adopt an unnatural posture. Thus, the wearer will likely find the system to be uncomfortable to wear over an extended period. This discomfort is exacerbated if the equipment is not correctly aligned.

Assistance is also required with the display system of WO 03/079319 during use, for example to replace batteries typically every hour or so. The location of the batteries in the carrying sack makes this awkward. The need for an assistant to support one or more wearers of such display systems increases the cost of each deployment of the systems.

A further problem with the rear-mounted backpack-style system of WO 03/079319 is that the backpack faces away from persons viewing the screen. Thus, the backpack is not useful for imparting additional information such as a marketing message to viewers of the screen. Also, as the speakers are positioned in the base support—which, in use, is behind the wearer—it may be difficult for viewers of the screen to hear the audio track clearly. The rear-mounted backpack also makes it difficult for viewers of the screen to interact with the displayed media, for example if the screen displays an interactive video game with which viewers interact by means of infra-red remote controls.

US Patent Application Publication No. US 2007/0199219 acknowledges some of the problems of the display system of WO 03/079319. It attempts to solve these problems by providing a rigid frame to be placed on the wearer's shoulders, rather than backpack-style flexible straps which require adjustment and which may become loose during use. The benefit of this rigid shoulder-mounting approach is that the overhead display panel is reliably held upright provided that the wearer stands upright with shoulders level.

The frame includes front and rear support members that bear against the wearer's chest and back in use to resist tipping. However, if the wearer leans too far forwards, backwards or to one side, the apparatus may still become unstable and fall off. This may cause injury to the wearer or to members of the public, and/or damage to the apparatus. The tendency to tip is exacerbated by the relatively high centre of gravity of the apparatus, as all or most of the electronic equipment is located above the wearer's head.

Due to the height of the centre of gravity, the weight of the display system of US 2007/0199219 is limited to ensure that it can be worn comfortably by people of different statures. As a consequence, the functionality of the display system, including battery life, screen size and speaker power, is also limited.

The present invention provides a wearable mobile display system which provides maximum functionality while at the same time being comfortable to wear. The invention also minimises the possibility of the system inadvertently falling from the wearer and causing injury and/or damage.

Against this background, according to a first aspect, the present invention resides in a wearable display apparatus, comprising a support structure for supporting a display, in use, above a wearer's head; and a weight-bearing torso support for supporting the support structure, the torso support being arranged to extend, in use, around the wearer's torso below the level of the wearer's arms; wherein the support structure comprises a yoke arranged to sit on the wearer's shoulders; and at least one support member extending from the display to the wearer's shoulders and from there to the torso support, said support member bearing on the yoke upon the wearer's shoulders to distribute the weight of the apparatus between the yoke and the torso support.

By concentrating much of the weight of the apparatus on a support that encircles the torso, the centre of gravity of the system is lowered greatly compared to the prior art systems described above. For example, the centre of gravity of the apparatus may be located within the wearer's torso. The yoke also bears some of the weight, hence spreading the load effectively between the wearer's shoulders and waist. In a preferred embodiment, the yoke bears a minority the weight of the apparatus. The torso support is preferably a waist belt allowing weight to be carried comfortably on the hips.

Indeed, the combination of torso support and yoke with the centre of gravity preferably below the yoke lends a self-righting quality to the system. The torso support preferably acts through the support member to resist tilting, in use, of the support structure about the yoke. It is therefore possible to increase the overall weight of the apparatus to increase its capability (for example, the size of the display and the sound output of the speakers) without jeopardising stability or comfort. Alternatively, a mobile display system of similar weight to the prior art systems can be worn with increased comfort and mobility for longer periods.

In a preferred embodiment, at least part of the support member extends, in use, in front of the wearer's torso. The support member may comprise at least one first coupling element, and the torso support comprises at least one second coupling element releasably engageable with the first coupling element. The first coupling element may be movable laterally with respect to the support member. The first coupling element may be pivotally mounted to the support member via a crank arm.

To allow a custom fit for the wearer of the apparatus, the first and second coupling elements may be selectively co-operable to define a plurality of positions of the support member with respect to the torso support. The first coupling element may comprise a pin and the second coupling element may comprise a socket that can receive the pin. In a preferred embodiment, the pin comprises at least one recess and the socket comprises at least one inwardly-facing protrusion engageable with the recess of the pin. The recess may be a groove encircling the pin and the protrusion may be a plunger or flange engageable with the groove.

To enable engagement, the socket may be open-sided for lateral insertion of the pin into the socket, and may engage the pin resiliently.

As an aid to storage and transportation of the apparatus, the support structure may be foldable, and may be arranged such that, in a folded configuration, the display is located adjacent to the support member below the yoke.

In a preferred embodiment, the support member extends, in use, downwardly from the display and behind the wearer's head to over the wearer's shoulders. The support member may also extend, in use, from over the wearer's shoulders downwardly in front of the wearer's chest to the torso support.

The support member preferably comprises laterally spaced uprights, and a cross-member may bridge the uprights at chest level. The uprights preferably converge at an apex to define an A-shaped frame, and the display may be located at the apex.

The support structure preferably carries at least one speaker or at least one further display. The torso support preferably carries one or more of a power source, a media source, an amplifier and a speaker. The torso-mounted modular arrangement of power and other equipment makes it simple to replace batteries and other elements where necessary, simply by disconnecting an element to be removed and connecting an element to be added. This can be done without removing the apparatus from the wearer and can be done quickly, hence reducing the need for assistance and maximising the availability of the apparatus for the purpose for which it is intended.

The yoke preferably comprises at least one attachment member co-operable with the support member, and the attachment member may comprise at least one latch element for locking the display in position above the wearer's head in use.

Preferably, the yoke is U-shaped in plan view, and the yoke may comprises shoulder portions joined by a rear portion that extends, in use, behind the wearer's neck.

According to a second aspect, the present invention resides in a wearable display apparatus, comprising a support structure for supporting a display, in use, above a wearer's head; and a torso support arranged to extend, in use, around the wearer's torso below the level of the wearer's arms, to bear a majority of the weight load of the apparatus; wherein the support structure comprises a yoke arranged to sit, in use, on the wearer's shoulders to locate the display with respect to the shoulders while bearing a minority of the weight load of the apparatus; and at least one support member extending between the yoke and the torso support to convey weight load from the yoke to the torso support.

According to a third aspect, the present invention resides in a wearable display apparatus, comprising a support structure for supporting a display, in use, above a wearer's head; and a torso support arranged to extend, in use, around the wearer's torso below the level of the wearer's arms; wherein the support structure comprises a yoke arranged to sit, in use, on the wearer's shoulders; and at least one support member connecting the yoke and the torso support; whereby the torso support acts through the support member to resist the support structure tilting backwards above the wearer's shoulders about the yoke.

According to a fourth aspect, the present invention resides in a wearable display apparatus, comprising a support structure for supporting a display, in use, above a wearer's head; and a torso support arranged to extend, in use, around the wearer's torso below the level of the wearer's arms; wherein the support structure comprises a yoke arranged to sit on the wearer's shoulders; and at least one support member extending, in use, in front of the wearer's torso between the yoke and the torso support to convey at least part of the weight load of the apparatus to the torso support.

According to a fifth aspect, the present invention also resides in a method of donning a wearable display apparatus, the method comprising donning a torso support; and engaging with the torso support a support structure for supporting a display above the wearer's head.

Preferably the method further comprises placing a yoke on the wearer's shoulders as a further support for the support structure, and the yoke may be placed on the wearer's shoulders before engaging the support structure with the torso support.

To ensure a good fit for the wearer, the method may comprise selecting the level of the support structure relative to the torso support before engaging the support structure with the torso support. Preferably, the method comprises raising the display above the wearer's head after engaging the support structure with the torso support. The display may be raised by unfolding the support structure.

It is to be appreciated that the features of one or more of the foregoing aspects may be combined as will be readily apparent to the skilled person. In particular, any of the features which are described as preferred or optional to the first aspect of the invention may be combined with the features of the second, third or fourth aspects of the invention.

In order that the invention may be more readily understood, reference will now be made, by way of example, to the accompanying drawings in which:

FIG. 4 is front view of the mobile display system in a folded configuration;

FIG. 5 is a side view of the mobile display system in the folded configuration shown in FIG. 4;

FIG. 6 is a rear view of the mobile display system in the folded configuration shown in FIGS. 4 and 5;

FIG. 11a is a detailed close-up view of a pin and a socket of the mobile display system prior to engagement;

FIG. 11b is a close-up cross-sectional view of the pin and socket of FIG. 11a;

FIGS. 12 to 14 are detailed close-up views of the pins and the sockets of the mobile display system, which illustrate a method of engagement of the pins and sockets;

Figure 1:
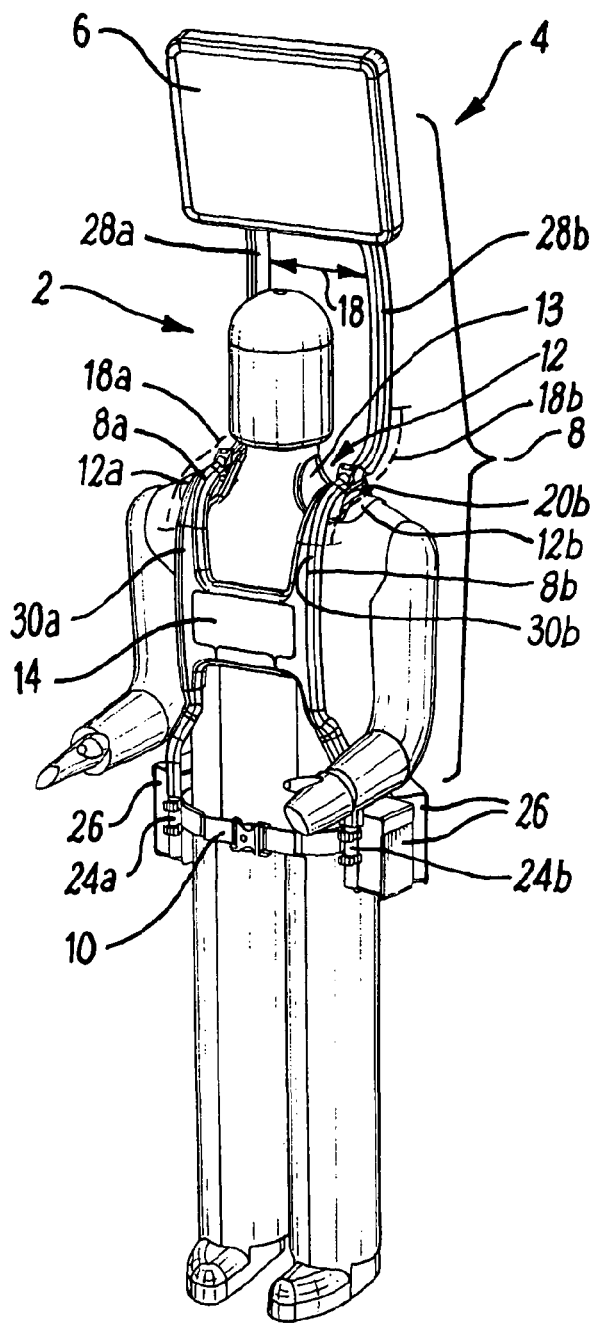
FIG. 1 is front perspective view of a mobile display system in use according to a first embodiment of the invention.
Figure 2:
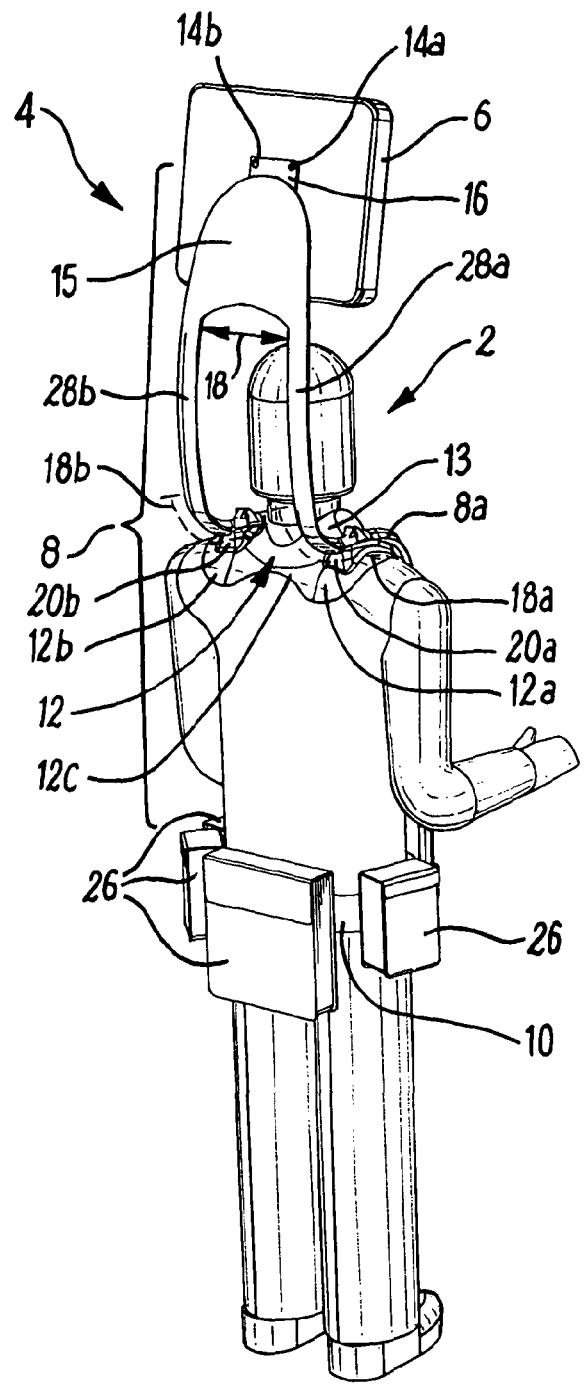
FIG. 2 is a rear perspective view of the mobile display system shown in FIG. 1.
Figure 3:
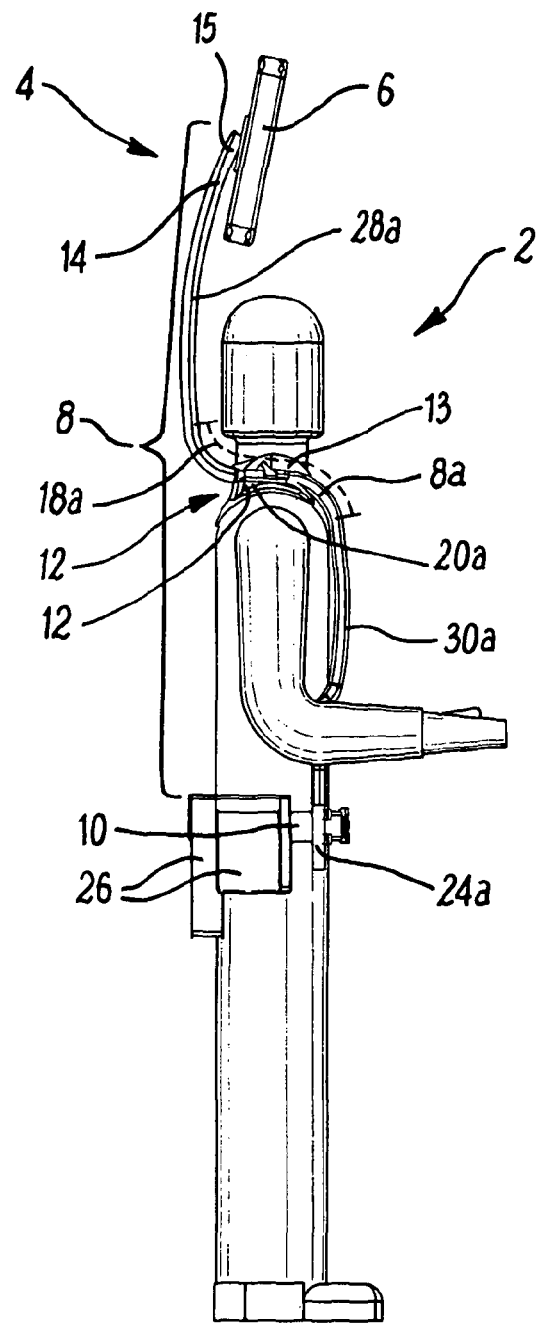
FIG. 3 is side view of the mobile display system shown in FIGS. 1 and 2.
Figure 7:
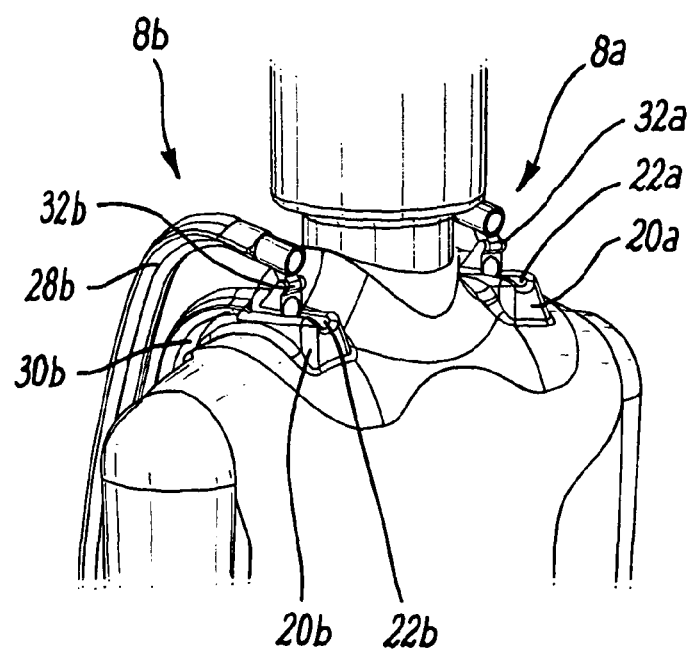
FIG. 7 is a close-up perspective view of the mobile display system shown in FIGS. 4 to 6 in the vicinity of the wearer's shoulders, as viewed from the rear.

A person being a wearer 2 of a mobile display system 4 according to the invention is shown schematically in FIGS. 1 to 3. The mobile display system 4 comprises an electronic display 6 such as an LCD screen on which, in use, information is displayed above the wearer's head and is visible to the front of the wearer. The display 6 is attached to the top of a frame 8 comprising a pair of tubular uprights 8a, 8b that extend downwardly behind the wearer's head, over the wearer's shoulders then in front of the wearer's chest to a belt 10 around the wearer's waist. A yoke 12 bridging the uprights 8a, 8b sits on the wearer's shoulders and extends behind the wearer's neck. A cross-member 14 bridges the uprights 8a, 8b in front of the wearer's chest. The uprights 8a, 8b and the cross-member 14 may be of metal (preferably aluminium, possibly steel) or plastics.

At the level of the wearer's head, the uprights 8a, 8b of the frame 8 are parallel. Above the wearer's head, the uprights 8a, 8b converge to an apex at an apex portion 15, and generally form an A-shape. The apex portion 15 of the frame 8 is webbed to increase its rigidity. At the apex portion 15, bolts 14a, 14b extend through a mounting plate 16 to secure the display 6 to the frame 8. The display 6 is tilted slightly downwardly for optimum visibility by viewers standing in front of the wearer 2: the degree of tilt may be adjustable, although this facility is not present in the embodiment shown.

Where the uprights 8a, 8b of the frame 8 converge at the apex portion 15, they are tilted slightly forwardly. Thus, the apex portion 15 and hence the display 6 are above the wearer's head in the side view shown in FIG. 3. This aligns the weight of the display 6 with the wearer's body to maximise the wearer's comfort in use of the system 4.

In side view, the uprights 8a, 8b of the frame curve downwardly and rearwardly from the apex portion 15 to behind the wearer's head, before curving forwards as they approach the wearer's shoulders. Where the uprights 8a, 8b lie generally parallel behind the wearer's head, they define a gap 18 slightly wider than the wearer's head. This is so that if the wearer looks upwards, for example to check the display 6, their head will not collide with the uprights 8a, 8b. The gap 18 also allows the wearer 2 to don the frame 8 when it is in a folded configuration, described in detail below.

The uprights 8a, 8b each have a kink 18a, 18b to extend forwards over the wearer's respective shoulders, each kink 18a, 18b imparting an S-shape to each upright 8a, 8b in side view as best shown in FIG. 3. At each kink 18a, 18b, the forwardly-extending portion of each upright 8a, 8b sits on, and is rigidly attached to, a respective shoulder portion 12a, 12b of the yoke 12.

The yoke 12 is shaped to sit on the wearer's shoulders to bear part of the weight of the system 4 when worn and to provide stability to the frame 8. The yoke 12 is U-shaped in plan view. The arms of the U rest on respective shoulders of the wearer to define the respective shoulder portions 12a, 12b. The base of the U extends behind the lower part of the wearer's neck at the cervical/thoracic junction (the C7/T1 region) to define a collar element 12c that joins the shoulder portions 12a, 12b. To avoid applying pressure to the wearer's throat, the yoke 12 does not extend around the front of the wearer's neck: it leaves a gap at the front.

The shoulder portions 12a, 12b of the yoke 12 are curved in side view and front view to conform to the curvature of the wearer's shoulders. The shoulder portions 12a, 12b and the collar element 12c curve upwards and inwards along the inside edge portion of the U to define a neck flange 13 that follows the contours of the junction between the wearer's neck and shoulders to provide further stability and comfort. Further to increase comfort, the yoke 12 is padded (not shown) where it rests on and against the wearer's shoulders and neck.

Each shoulder portion 12a, 12b comprises a raised plinth 20a, 20b, shown most clearly in FIGS. 7 to 10, which defines a upwardly-facing channel 22a, 22b to receive the forwardly-extending portion of a respective upright 8a, 8b. These channels 22a, 22b each have a concave cross-section that complements the convex curvature of the opposed part of each upright 8a, 8b to resist lateral movement of the uprights 8a, 8b off the yoke 12.

Curving downwardly again in front of the yoke 12, the uprights 8a, 8b then continue downwardly in parallel in front of, but clear of, the wearer's chest. Here they are bridged by the cross-member 14 mentioned above: that cross-member 14 is generally oblong and may carry a speaker and/or information such as a marketing message.

Below the cross-member 14, the uprights 8a, 8b splay away from each other outwardly and curve rearwardly around and with respect to the kidney region of the wearer's torso. Each upright 8a, 8b terminates in a respective pin 22a, 22b, shown most clearly in FIGS. 11a to 14, that is received in a respective complementary socket 24a, 24b mounted on the belt 10. The sockets 24a, 24b are situated on the belt 10 with one to each side of the wearer's body to bring the weight of the system 4 closer to the centre of the wearer's body when viewed from the side.

Advantageously, the pins 22a, 22b are indexible between successive insertion positions in the sockets 24a, 24b, whereby the system 4 may be adjusted to suit wearers with different lengths of torso. A mechanism for doing so will be described later with reference to FIGS. 11a to 14.

The belt 10 is suitably made of canvas or leather. Batteries, one or more signal sources for the display—such as a DVD player, personal computer or mp3 player—and other equipment such as an inverter, amplifier and speakers are housed in cases 26 mounted on the belt 10. In addition, the belt 10 may support speakers to play an audio track, in which case the speakers are preferably mounted on the front of the belt 10 for optimum sound transmission to viewers of the display 6. In an alternative embodiment of the invention, the speakers may be integrated into the display 6 or the frame 8, for example on the cross-member 14 as mentioned above, or possibly between the cross-member 14 and the wearer's shoulders.

Power and communication cables (not shown) connect the display 6 to the equipment mounted on the belt 6. To prevent snagging, the cables extend from the display 6 inside the frame 8 and exit the frame just above one or both of the pins 22a, 22b. The cables have connectors at their lower ends which connect to the equipment of the belt 10.

The frame 8 of the display system 4 of the present invention may be folded for compactness, as shown in FIGS. 4 to 7, such that the display 6 is folded towards the belt 10 and lies below the cross-member 14 when folded. This is particularly useful when the wearer 2 dons or removes the system 4, or when storing or transporting the system 4. It may also be useful when the wearer 2 is moving about before or after use of the system 4, particularly through doorways or other locations where headroom may be limited.

For the purpose of folding, each upright 8a, 8b has an upper portion 28a, 28b and a lower portion 30a, 30b joined by a hinge 32a, 32b at shoulder level, situated on the forwardly-extending portion at each kink 18a, 18b. The upper portions 28a, 28b are therefore generally L-shaped in side view and extend from the apex 15 of the frame 8 to the hinges 32a, 32b. The lower portions 30a, 30b are also generally L-shaped in side view, but inverted, and extend from the hinges 32a, 32b to the belt 10.

Figure 8:
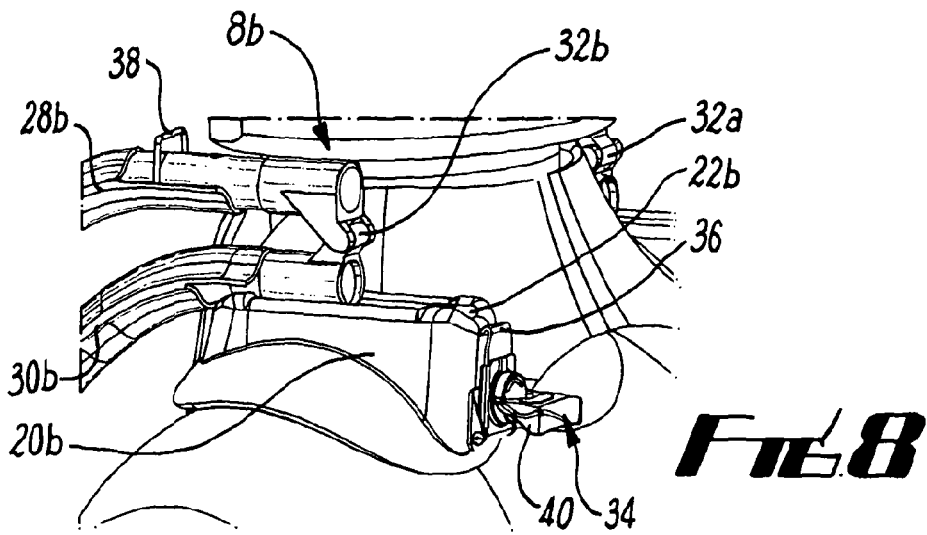
FIGS. 8, 9 and 10 are detailed close-up views of one of the hinges shown in FIG. 7, which illustrate a method of locking the mobile display system in an unfolded configuration, ready for use.
Figure 9:
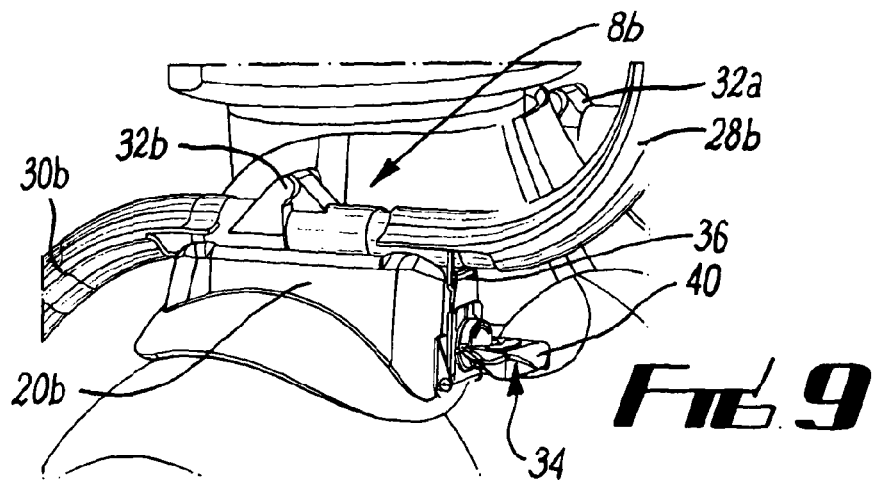
Figure 10:
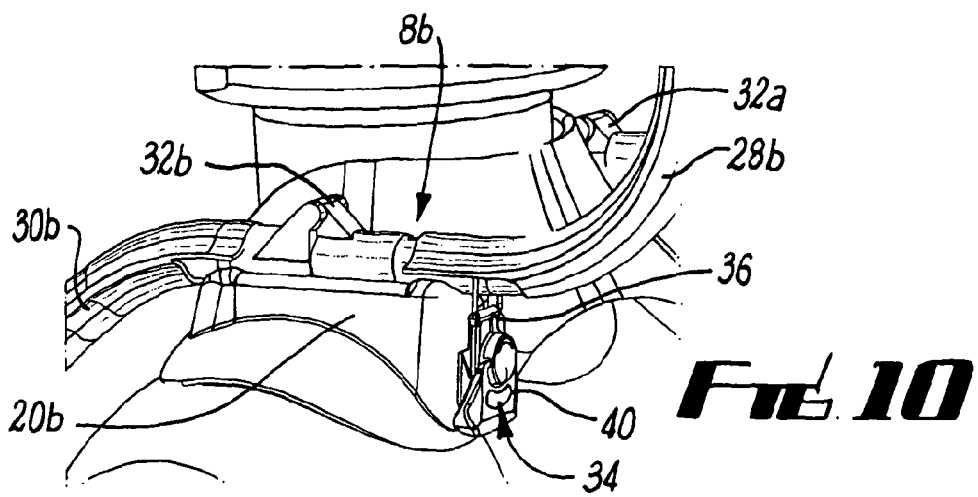

Referring particularly now to FIGS. 8 to 10, a latch fastener 34 is attached to the rear of the left plinth 20b provided on the left shoulder portion 12b of the yoke 12. The fastener 34 has a hook 36 that engages with a corresponding loop 38 located on the corresponding left upper portion 28b. FIG. 8 shows the fastener 34 and hook 36 on the left plinth 20b and left upper portion 28b of the display system 4, with the upper portion 28b and the lower portion 30b in the folded configuration. A corresponding fastener and loop (not shown) are arranged in the same way on the right plinth 28a and right upper portion 28a respectively.

To unfold the upper portions 28a, 28b and the lower portions 30a, 30b, the upper portions 28a, 28b are raised above the wearer's head until the lower parts of the upper portions 28a, 28b rest in the channels 22a, 22b with the ends of the upper portions 28a, 28b and the ends of the lower portions 30a, 30b bearing against each other, as shown in FIG. 9.

The fastener 34 has a lever 40 arranged such that raising the lever 40 raises the hook 36 over the loop 38 enabling the hook 36 to engage with and tension the loop 38 when the lever 40 is lowered in an over-centre action, as shown in FIG. 10. Again, the corresponding fastener on the right plinth 28a comprises a further lever (not shown). The levers are held in the lowered position by the over-centre action such that the upper portions 28a, 28b and the lower portions 30a, 30b are securely maintained in the unfolded configuration. To fold the frame portions 28a, 28b, 30a, 30b again, the levers are raised to release the hooks from the loops and the upper portions 28a, 28b are folded forwardly and downwardly against the lower portions 30a, 30b.

Moving now to FIGS. 11a to 14, these drawings illustrate a mechanism for adjusting the system to suit wearers with different lengths of torso. In that mechanism, the pins 22a, 22b at the lower ends of the uprights 8a, 8b are elongate and have a circular cross-section. Each pin 22a, 22b tapers at its end and has a rounded head 42a, 42b. Each pin 22a, 22b has a series of equally-spaced grooves 44 machined around its circumference. The diameter of a pin 22a, 22b between the grooves 44 is therefore greater than the diameter within the grooves 44.

When preparing to use the mobile display system 4 of the present invention, the wearer 2 first secures the belt 10 around their waist. The sockets 24a, 24b are mounted on the belt 10 and, if necessary, may be moved around the belt 10 so that they are correctly aligned to receive the pins 22a, 22b of the uprights 8a, 8b. Each socket 24a, 24b comprises a U-section socket channel 46 (which is shown in FIG. 11b in respect of the right socket 24a only) that extends vertically, the channel section being part-circular and defining a gap 47 that is slightly narrower than the diameter of that circle.

As shown in FIG. 11b, an inwardly-extending flange 48 extends around the interior of each socket channel 46 and lies in a plane orthogonal to the longitudinal axis of that channel 46. Each flange 48 has parallel sides joined by a part-circular wall such that in plan view, each flange 48 tapers at each side as it approaches the gap 47 in the part-circular channel section. Each flange 48 has a thickness selected to fit within a groove 44 of the respective pins 22a, 22b.

The gap 47 in the part-circular section of each socket channel 46 is slightly narrower than the diameter of the respective pins 22a, 22b of the uprights 8a, 8b. Thus, when the pins 22a, 22b are inserted rearwardly into each socket channel 46, the respective socket 24a, 24b flexes resiliently to embrace each pin 22a, 22b in a snap-fit manner. It is only possible for the pins 22a, 22b to enter each socket channel 46 in this way when a selected groove 44 of each pin 22a, 22b is aligned with each flange 48 of each socket channel 46. Engagement between the flanges 48 and a selected grooves 44 locates the pins 22a, 22b vertically with respect to the sockets 24a, 24b.

Each groove 44 thereby defines a respective vertical position for the uprights 8a, 8b with respect to the sockets 24a, 24b of the belt 10 and hence adapts the frame 8 of the display system 4 to a particular torso length. Also, by virtue of the flange-to-groove engagement and the resilient snap-fit between the pins 22a, 22b and each socket channel 46, the uprights 8a, 8b are held securely in the chosen position with respect to the sockets 24a, 24b.

Security is enhanced by flaps 50a, 50b which close the gap 47 in each socket channel 46 to enclose the pins 22a, 22b retained within. Each flap 50a, 50b is hinged at one end to the socket 24a, 24b on one side of each gap 47 and is secured at its free end to the socket 24a, 24b on the other side of each gap 47 to close each socket channel 46 securely.

As mentioned above, to make donning the system 4 easier, the frame 8 is initially in the folded configuration and the flaps 50a, 50b of the sockets 24a, 24b are open. The cross-member 14, the lower portions 30a, 30b of the uprights 8a, 8b and the yoke 12 together define a opening which is aligned with a corresponding opening between the upper portions 28a, 28b of the uprights 8a, 8b when the frame 8 is in the folded configuration. To don the frame 4, the frame 4 is lifted above the wearer's head and lowered so that the wearer's head passes through the aligned openings as the yoke 12 approaches and then rests on the wearer's shoulders. With the yoke 12 taking the weight of the system 4 initially on the wearer's shoulders, the wearer 2 or an assistant slots the pins 22a, 22b into the sockets 24a, 24b, as illustrated in FIGS. 11a and 11b, so that the flange 48 of each socket 24a, 24b engages with one of the grooves 44 of the pins 22a 22b, as illustrated in FIG. 12. If necessary, the pins 22a, 22b may be removed from the channels 46 and reinserted so that another groove 44 of each pin 22a, 22b, as illustrated in FIG. 13, engages with each flange 48 for a better fit for the wearer 2. A good fit is achieved when the yoke 12 rests comfortably on the wearer's shoulders and there is a good balance of weight borne by the yoke 12 and the belt 10. The flaps 50a, 50b are then closed to secure the pins 22a, 22b in the sockets 24a, 24b.

The wearer 2 then unfolds the uprights 8a, 8b about the shoulder-level hinges 32a, 32b and secures them in the unfolded position using the fasteners 34. The power and communication cables are then attached to the appropriate equipment on the belt 10 and the system 4 can be initialised and used.

Figure 15:
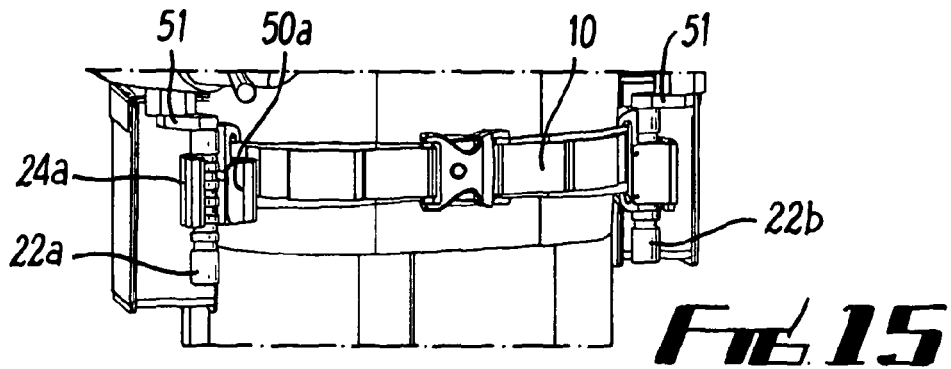
FIGS. 15 and 16 are detailed close-up views of a second, preferred pin arrangement during engagement of pins with sockets.
Figure 16:
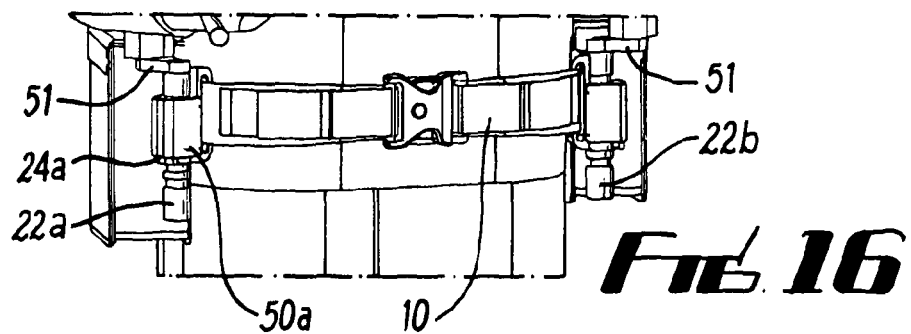
Figure 17:
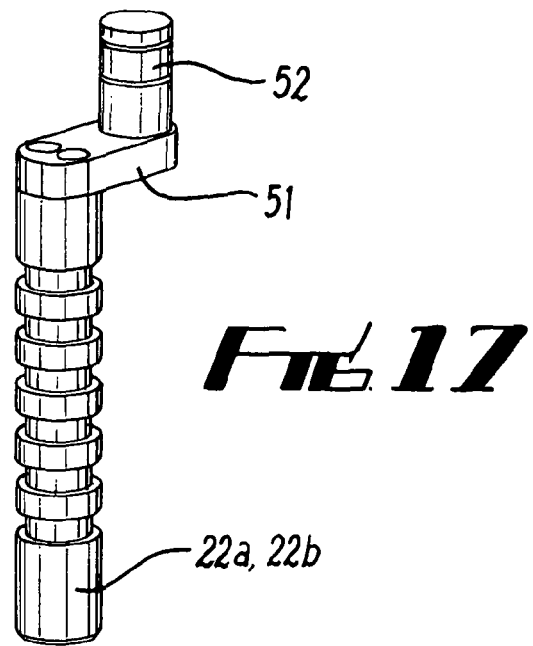
FIG. 17 is a further enlarged view of a pin used in that preferred arrangement.

FIGS. 15 to 17 illustrate a second, preferred pin arrangement. This works in much the same way as the arrangement described above, so like numerals are used for like parts. FIG. 15 shows a pin 22a being engaged with a socket 24a in the manner described above, and FIG. 16 shows the flap 50a closed to secure the pin 22a in the socket 24a. However, this arrangement provides an additional facility to move the longitudinal axes of the pins 22a, 22b with respect to the uprights 8a, 8b.

In this alternative arrangement, each pin 22a, 22b is carried by a respective crank arm 51 that extends orthogonally from a pivot stud 52. The pivot stud 52 is pivotally mounted to an end of a respective lower portion 30a, 30b of an upright 8a, 8b. By virtue of the crank arm 51, the longitudinal axis of the pin 22a, 22b is laterally offset from, and parallel to, the pivot axis defined by the pivot stud 52.

Thus, by turning the crank arm 51 about the pivot axis of the pivot stud 52, the pin 22a, 22b may be moved forwardly, rearwardly, inwardly and outwardly with respect to the associated upright 8a, 8b and with respect to the wearer's torso. This allows greater adjustability when the system 4 is worn by different people with different waist sizes and body shapes. For example, a slim wearer 2 may wish to turn the crank arms 51 inwardly to position the pins 22a, 22b inboard of the uprights 8a, 8b. Different wearers 2 may also have different personal preferences as to where on their waist they wish to carry the weight load of the system 4. The pivotable crank arms 51 can cater for those preferences.

In an alternative (not shown) to the groove-and-flange systems described above, the U-shaped channels 46 of the sockets 24a, 24b are replaced with hollow tubes into which the pins 22a, 22b are inserted vertically. A retractable plunger is provided in the side wall of each tube. The plunger is reciprocally movable along an axis orthogonal to the axis of each pin 22a, 22b to engage with a groove 44 of each pin 22a, 22b when aligned with the plunger. The plunger is spring-biased to engage with a groove 44 and hence to lock the mechanism, but can be retracted against the bias to free the mechanism by pulling a knob and will then return to the engaged position by releasing the knob. The plungers are retracted to allow the pins 22a, 22b to enter the sockets 24a, 24b to engage each pin 22a, 22b freely with its respective socket 24a, 24b, and the yoke 12 is rested on the wearer's shoulders.

When the yoke 12 rests comfortably on the wearer's shoulders, the knobs are released to engage and lock the plungers of the sockets 24a, 24b in appropriate grooves 44 of the pins 22a, 22b. If a plunger is not aligned with a groove 44, the wearer 2 may have to raise or lower the frame 8 a little relative to the belt 10 so that the plungers each engage with a groove 10. Once the pins 22a, 22b are secured, the display system 4 may be initialised and used.

In general, the present invention may be embodied in other specific forms without departing from its essential attributes. Accordingly, reference should be made to the appended claims and other general statements herein rather than to the foregoing specific description as indicating the scope of the invention.

The invention claimed is:

1. A wearable display apparatus, comprising:
an electronic display;
a support structure for supporting the electronic display, in use, above a wearer's head such that information is displayed on the electronic display above the wearer's head and is visible to the front of the wearer; and
a weight-bearing torso support for supporting the support structure, the torso support being arranged to extend, in use, around the wearer's torso below the level of the wearer's arms;
wherein the support structure comprises:
a yoke arranged to sit on the wearer's shoulders; and
at least one support member extending from the electronic display to the torso support, said support member further bearing on the yoke upon the wearer's shoulders, wherein said support member distributes the weight of the apparatus between the yoke and the torso support.

2. The apparatus of claim 1, wherein the torso support is a waist belt.

3. The apparatus of claim 1, wherein, in use, the yoke bears a minority the weight of the apparatus.

4. The apparatus of claim 1, wherein the support member comprises at least one first coupling element, and the torso support comprises at least one second coupling element releasably engageable with the first coupling element.

5. The apparatus of claim 4, wherein the first coupling element is movable laterally with respect to the support member.

6. The apparatus of claim 5, wherein the first coupling element is pivotally mounted to the support member via a crank arm.

7. The apparatus of claim 4, wherein the first and second coupling elements are selectively co-operable to define a plurality of positions of the support member with respect to the torso support.

8. The apparatus of claim 4, wherein the first coupling element comprises a pin and the second coupling element comprises a socket that can receive the pin.

9. The apparatus of claim 8, wherein the pin comprises at least one recess and the socket comprises at least one inwardly-facing protrusion engageable with the recess of the pin.

10. The apparatus of claim 8, wherein the socket engages the pin resiliently.

11. The apparatus of claim 1, wherein the support structure is foldable.

12. The apparatus of claim 11 and being arranged such that, in a folded configuration, the electronic display is located adjacent to the support member below the yoke.

13. The apparatus of claim 1, wherein the support structure carries at least one speaker or at least one further electronic display.

14. The apparatus of claim 1, wherein the torso support carries one or more of: a power source, a media source, an amplifier and a speaker.

15. The apparatus of claim 1, wherein the yoke comprises at least one attachment member co-operable with the support member.

16. The apparatus of claim 15, wherein the attachment member comprises at least one latch element for locking the electronic display in position above the wearer's head in use.

17. The apparatus of claim 1, wherein the yoke is U-shaped in plan view.

18. The apparatus of claim 17, wherein the yoke comprises shoulder portions joined by a rear portion that extends, in use, behind the wearer's neck.

* * * * *